United States Patent
Grill et al.

(10) Patent No.: US 9,654,484 B2
(45) Date of Patent: May 16, 2017

(54) DETECTING DGA-BASED MALICIOUS SOFTWARE USING NETWORK FLOW INFORMATION

(71) Applicant: Cisco Technology, Inc., San Jose, CA (US)

(72) Inventors: Martin Grill, Prague (CZ); Ivan Nikolaev, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 14/448,637

(22) Filed: Jul. 31, 2014

(65) Prior Publication Data

US 2016/0036836 A1 Feb. 4, 2016

(51) Int. Cl.
  *H04L 29/00* (2006.01)
  *H04L 29/06* (2006.01)
  *H04L 29/08* (2006.01)
  *H04L 29/12* (2006.01)

(52) U.S. Cl.
  CPC ...... *H04L 63/1416* (2013.01); *H04L 61/1511* (2013.01); *H04L 63/145* (2013.01); *H04L 67/104* (2013.01); *H04L 2463/144* (2013.01)

(58) Field of Classification Search
  CPC ...... G06F 21/577; G06F 21/56; G06F 21/566; G06F 21/55; H04L 29/12066; H04L 61/1511; H04L 63/145; H04L 63/1408; H04L 29/06; H04L 63/14; H04L 63/00
  See application file for complete search history.

(56) References Cited

U.S. PATENT DOCUMENTS

| | | | | |
|---|---|---|---|---|
| 6,377,808 | B1* | 4/2002 | Korneluk | H04W 88/02 370/392 |
| 8,260,914 | B1* | 9/2012 | Ranjan | H04L 61/1511 709/224 |
| 8,284,764 | B1* | 10/2012 | Nucci | H04L 41/12 370/352 |
| 2007/0073660 | A1* | 3/2007 | Quinlan | G06Q 10/107 |
| 2009/0013089 | A1* | 1/2009 | Sullivan | H04L 67/2814 709/238 |
| 2009/0028151 | A1* | 1/2009 | Schmidt | H04L 47/10 370/392 |
| 2010/0106854 | A1* | 4/2010 | Kim | H04L 29/12066 709/238 |
| 2012/0084860 | A1* | 4/2012 | Cao | H04L 63/1441 726/23 |
| 2013/0191915 | A1* | 7/2013 | Antonakakis | G06F 21/56 726/23 |
| 2013/0318603 | A1* | 11/2013 | Merza | H04L 63/1441 726/22 |

(Continued)

*Primary Examiner* — Mohammad A Siddiqi
(74) *Attorney, Agent, or Firm* — Hickman Palermo Becker Bingham LLP; Malgorzata A. Kulczycka

(57) ABSTRACT

Detecting DGA-based malware is disclosed. In an embodiment, a number of domain name server requests originating from a particular host among a plurality of hosts is determined. The number of domain name server requests are directed to one or more domain name servers. A number of internet protocol addresses contacted by the particular host is determined. Based on the number of domain name server requests and the number of internet protocol addresses contacted existence of malware on the particular host is determined.

18 Claims, 5 Drawing Sheets

(56) References Cited

U.S. PATENT DOCUMENTS

| | | | |
|---|---|---|---|
| 2014/0075557 A1* | 3/2014 | Balabine | H04L 63/20 726/23 |
| 2014/0157416 A1* | 6/2014 | Holloway | H04L 63/1458 726/23 |
| 2015/0047033 A1* | 2/2015 | Thomas | H04L 63/1408 726/23 |
| 2015/0229659 A1* | 8/2015 | Tal | G06F 9/45533 726/23 |
| 2016/0080236 A1* | 3/2016 | Nikolaev | H04L 63/00 709/224 |

* cited by examiner

DETECTING DGA-BASED MALICIOUS SOFTWARE USING NETWORK FLOW INFORMATION

TECHNICAL FIELD

The present disclosure generally relates to improvements in computers that are configured for detecting malware on a network. The disclosure relates more specifically to improved computer-implemented techniques for detecting domain generating algorithm malware.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Botnets are the root cause of many malicious activities in telecommunications networks including denial of service attacks, click frauds, adware, distributed brute-forcing of a remote service, identity and data thefts, sending spam, and many more. A botnet comprises a number of machines, called bots, on which malicious software has been installed typically without the knowledge of users who are innocent or unaffiliated with the hacker. A botmaster is the attacker, and the botmaster remotely controls the bots using command and control (C&C) communication channels. When malware compromises a machine, the machine attempts to establish a connection to one or more C&C servers in order to download updates, retrieve commands, or transmit private information gained from the machine.

The most popular botnet structure is the centralized structure. In the centralized structure, the bots contact a particular pre-defined domain or internet protocol (IP) address on which the C&C server is located. The single point of failure in the centralized structure is the C&C server. Therefore, once the C&C server is taken down, the botmaster loses the entire botnet. One of the approaches to disable the C&C server has been to blacklist well-known C&C domain names to block communication with C&C servers associated with those C&C domain names.

However, modern malware has evolved and uses various techniques to hide its C&C server including the use of a domain generating algorithm (DGA). The DGA may be a simple algorithm that uses a seed, such as a current date and/or time to generate alphanumeric domain names. Alternatively, the DGA may be a complex algorithm that is sophisticated enough to generate English-language-like domain names with properly matched syllables or combinations of English dictionary words. A bot with DGA-based malware periodically attempts to communicate with the botmaster, and each attempt to communicate with the botmaster involves generating a plurality of domain names using a DGA and attempting to resolve each of the domain names until a domain name successfully resolves to the IP address of the C&C server for that malware. Prior to the bot communicating with the botmaster, the botmaster, using its own copy of DGA with the same seed as the DGA on the bot, generates a domain name and registers the domain name as the domain name for the C&C server, thus rendering techniques involving blacklisting of domain names ineffective.

To reduce the detectability of a C&C server, the botmaster tries to minimize the amount of time during which its C&C servers are exposed. The botmaster minimizes the exposure time by registering the domain names and making domain name system (DNS) server configurations only a few minutes prior to the time at which the DGA is configured to communicate with the C&C server. Once the time frame in which the DGA is configured to communicate with the botmaster passes, the C&C servers are shut down and removed immediately. Such minimization of exposure time renders ineffective any detection mechanisms that rely on a static domain name list. Additionally, DNS records associated with IP address of C&C server are deleted, therefore tracing of a DNS record to an IP address is also not feasible. Moreover, DGAs that can create English-language-like domains with properly matched syllables or use combinations of English dictionary words are almost always undetectable by means of a network domain's language analysis.

In a scenario where a bot is discovered, the bot has to be reverse engineered to uncover the DGA affecting the bot in order to block domain names generated by the DGA on the firewall or register the generated domain names before the botmaster registers them. Reverse engineering, however, is very time-consuming and requires an extremely advanced skill set. Additionally, the botmaster may configure the DGA to use a seed that is based on responses of popular websites such as google.com, baidu.com, answers.com or even trending topics on social networking websites such as Twitter or Facebook that are unknown in advance. Therefore, reverse engineering and employing a technique to filter domain names is also ineffective. Furthermore, the bot can generate so many domains, that registering or blocking all of the domain names is unfeasible. Thus, techniques for better detection of DGA-based malware are needed.

DESCRIPTION OF EXAMPLE EMBODIMENTS

Figure 1:
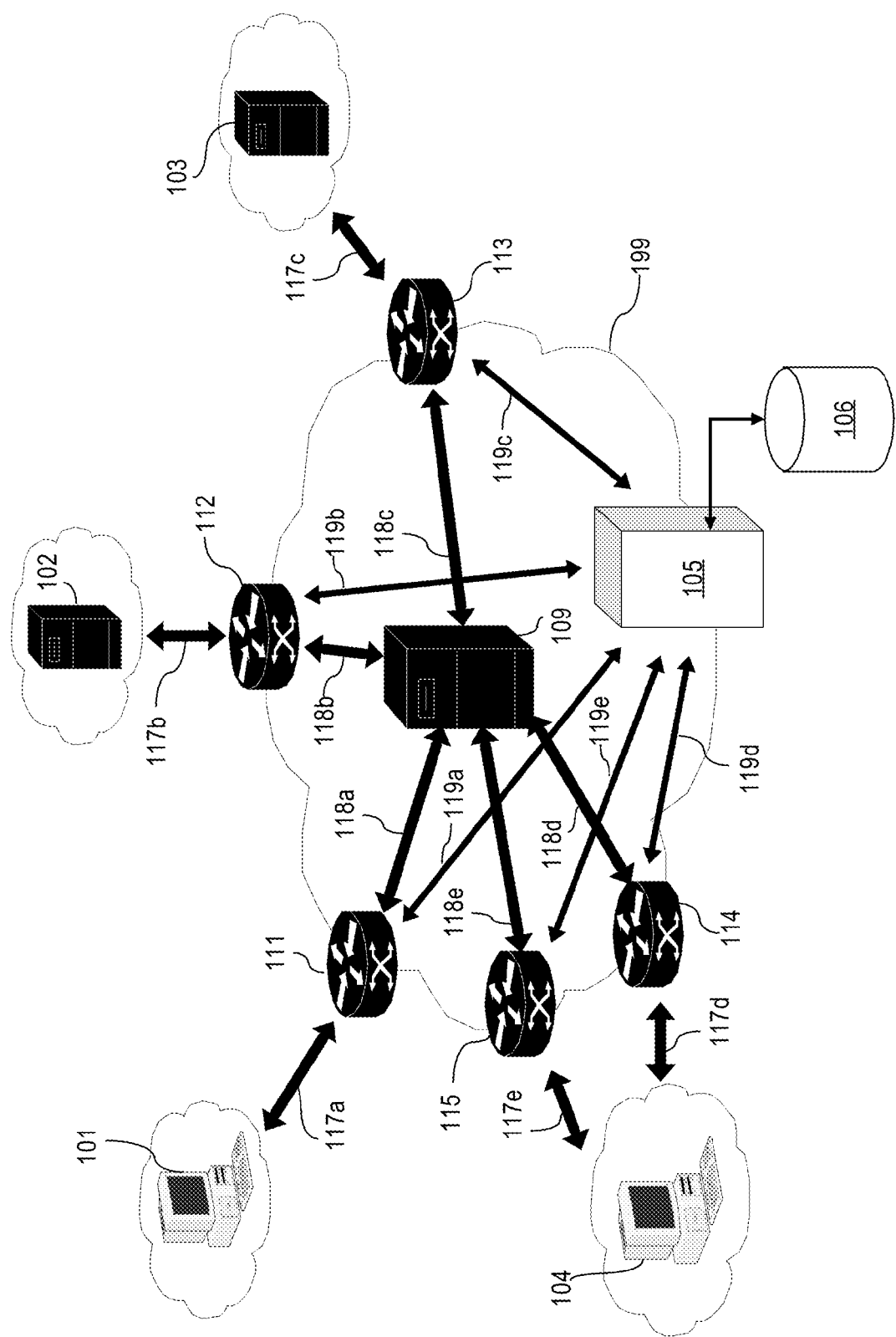
FIG. 1 illustrates an example networking arrangement for DGA-based malware detection.

As one example embodiment, improved computer-implemented detection of DGA-based malware using network flow information is described; unlike past approaches, embodiments provide an improvement over the general idea of detecting DGA-based malware by obtaining and using network flow information in specified ways. Consequently, the techniques herein provide for more efficient use of computer resources and processing time to detect DGA-based malware. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 Overview
2.0 Structural and Functional Overview
3.0 Method of Detecting DGA-Based Malware
4.0 Implementation Mechanisms—Hardware Overview
5.0 Extensions and Alternatives 1.0 Overview In an embodiment, a method is described for identifying existence of malware on a particular network node. In an embodiment, using a network device, in a communications network that comprises a plurality of network nodes, a number of domain name server requests originating from a particular network node are determined, wherein the domain name server requests are directed to one or more domain name servers. A number of internet protocol addresses (IP addresses) contacted by the particular network node are determined. Based on the number of domain name server requests and the number of IP addresses contacted, existence of malware on the particular network node is identified.

In other embodiments, the disclosure encompasses a data processing system, a computer apparatus and a computer-readable medium configured to carry out the foregoing steps.

2.0 Structural and Functional Overview

Certain embodiments, described herein, reduce or eliminate costs associated with detecting DGA-based malware and/or improve detection of DGA-based malware by using a data source that is not used or considered in prior approaches. In an embodiment, by utilizing network flow information, a computer configured as described herein may identify network nodes that are compromised by DGA-based malware without resorting to more time-consuming techniques, such as reverse engineering the DGA-based malware's binary or analysis of DNS server logs, which are not always available, or privacy-breaching techniques such as deep packet inspection of DNS server packets.

As described herein, a network flow is a sequence of packets transmitted from a source address to a destination address. Typically a network flow comprises a set of packets that share the same five-tuple of values including source network address, destination network address, source port number, destination port number, and protocol identifier. Network flow information may be obtained from internetworking devices such as routers and switches that host network flow management services such as, but not limited to, NetFlow or Internet Protocol Flow Information Export (IPFIX). Netflow is commercially available as part of IOS Software from Cisco Systems, Inc., San Jose, Calif.

For purposes of illustrating a clear example, assume that a network comprises numerous computer hosts, where certain hosts may be interacted with directly by a user, such as a workstation, and certain hosts may be servers such as web servers. To monitor the network and the hosts for malicious activities, the network operator may desire to have a detection system that detects DGA-based malware and is capable of avoiding any scalability issues that a growing network may face in the future while also not reducing the privacy of network users. The network operator may also desire a detection system that is capable of searching for DGA-based malware numerous times in a particular time interval without facing performance issues.

In an embodiment, the network operator may configure a metering process at an internetworking device serving as an observation point to collect network flow information about packets originating from the hosts, and may configure an exporter to export that information to a collector computer that is configured as described herein. The collector may be configured to determine the number of DNS server requests made by a particular host within a particular time interval and the number of internet protocol (IP) addresses contacted by the particular host within the particular time interval based on the network flow information received at the collector. For the particular host, existence of DGA-based malware may be identified based on the number of DNS server requests and the number of IP addresses contacted by the particular host within the particular time interval.

The network operator may configure the metering process at routers that receive packets from the hosts. The network operator may additionally configure the routers to be the exporter. In some embodiments, the network flow information may be formatted and transmitted using services or protocols such as IPFIX or NetFlow.

In some embodiments, a value based on a ratio of the number of DNS server requests made by the particular host to the number of IP addresses contacted by the particular host is determined. The value is compared with a threshold value, which is based on the ratios of the number of DNS server requests made by other hosts within the network to the number of IP addresses contacted by other hosts within the network. If the value for the particular host is greater than the threshold value, then the particular host is identified as one that is compromised with DGA-based malware.

Using these techniques, DGA-based malware may be detected efficiently on, both, small and large scale networks, without negatively impacting privacy of network users.

The foregoing operations are described further herein in connection with FIG. 1 and the other drawing figures.

FIG. 1 illustrates an example networking arrangement for identifying the existence of DGA-based malware on one or more hosts. As described herein, the host may be an electronic digital data processing device configured to receive instructions directly from a user such as a personal computer, a workstation, a mobile computing device. Alternatively, the host may be a service that accepts messages from other electronic digital data processing devices and transmits responses to the messages, such as a webserver.

The networking arrangement of FIG. 1 comprises a plurality of hosts 101, 102, 103, 104, and a plurality of computing devices 111, 112, 113, 114, 115, each of which is configured as an element of internetworking infrastructure, such as a router or switch or other computing devices that includes routing and switching logic, a computing device configured as a collector of network flow information (referenced by numeral 105), a data storage unit 106, and a domain name system (DNS) server unit 109.

Hosts 101, 104 are each computing devices that are configured to receive instructions directly from a user. In various embodiments each of the hosts 101, 104 may comprise a personal computer, a workstation, a mobile computing device, etc. Hosts 102, 103 are web server computers. Hosts 101, 102, 103, 104 communicate with other computing nodes by transmitting and receiving packets via paths 117a, 117b, 117c, 117d, 117e.

In the example illustrated in FIG. 1, computing devices 111, 112, 113, 114, 115 are each routers in network 199 that receive packets from and transmit packets to hosts 101, 102, 103, 104. Routers 111, 112, 113, 114, 115, may each connect to the Internet and communicate with other network nodes and computing devices that have been configured to receive and transmit packets. Routers 111, 112, 113, 114, 115 also send network flow information to collector 105 on paths 119a, 119b, 119c, 119d, 119e, respectively. The transmission of network flow information to collector 105 is further described herein with reference to FIG. 2. Hosts 101, 102, 103, 104 may transmit DNS server requests in order to resolve one or more domain names. DNS server requests may be directed to the domain name server 109. Routers 111, 112, 113, 114, 115 may transmit DNS server requests via paths 118a, 118b, 118c, 118d, 118e to DNS server 109. Collector 105 is coupled with data storage unit 106. In some embodiments, data storage unit 106 may be housed within the same computing device as collector 105.

Figure 2:
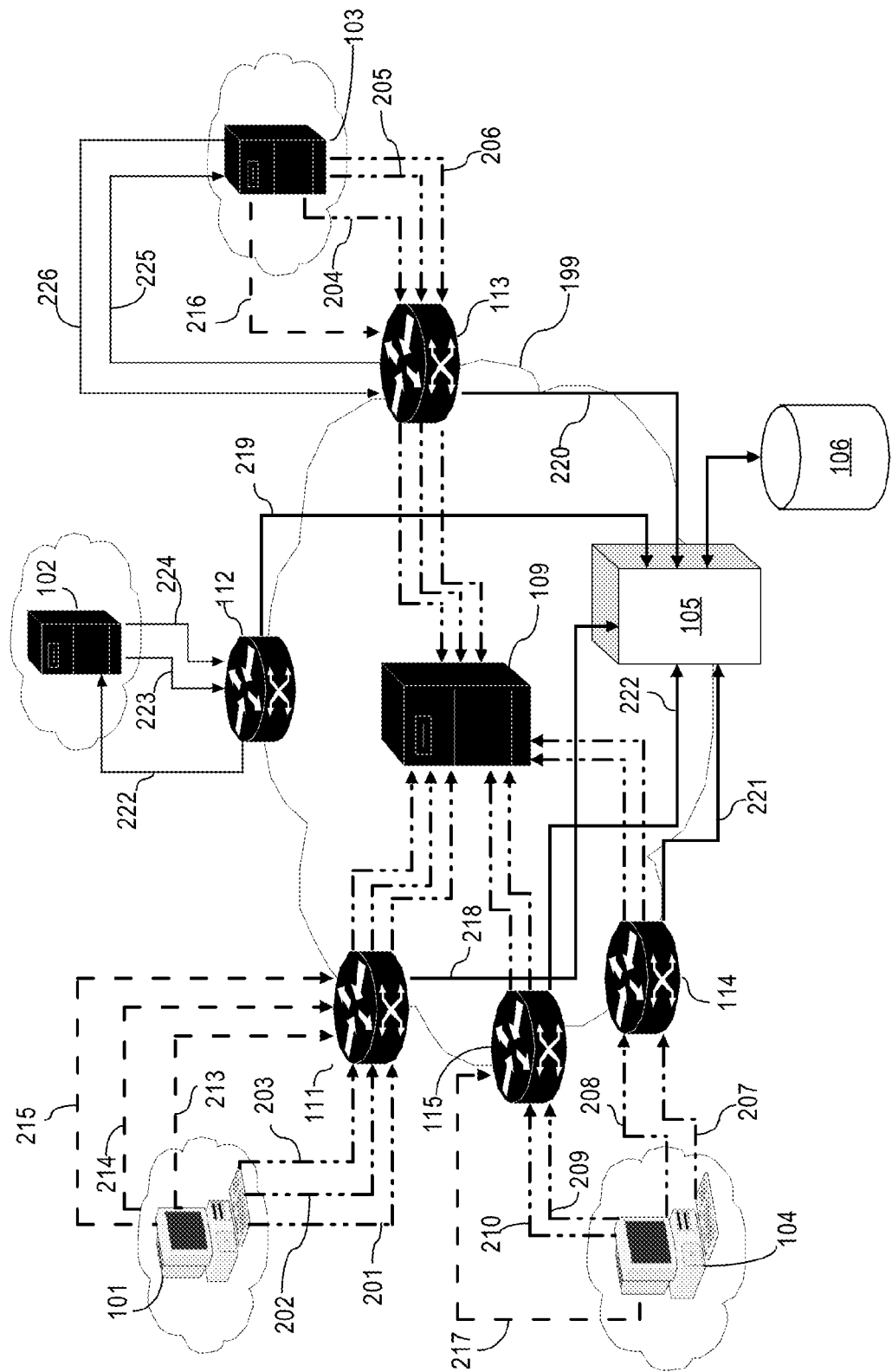
FIG. 2 illustrates the exchange of network flow information on an example networking arrangement.

FIG. 2 illustrates the exchange of network flow information on an example networking arrangement. In an embodiment, routers 111, 112, 113, 114, 115 are configured as observation points in network 199 that collect network flow information about packets received at the respective routers and forward messages 218, 219, 220, 221, 222, to collector 105. Messages 218, 219, 220, 221, 222, each comprise network flow information obtained at routers 111, 112, 113, 114, 115, respectively, for a particular time interval. Messages 218, 219, 220, 221, 222, may each be formatted according to internet protocol flow information export (IPFIX) or NetFlow protocols and/or output from an IPFIX service or NetFlow service that is hosted on or executed by the routers. Routers 111, 112, 113, 114, 115 may periodically forward network flow information to collector 105.

In an embodiment, hosts 101, 102, 103, 104 may resolve one or more domain names to the IP addresses of the domain names in order to communicate with the domain names. In order to resolve one or more domain names to their IP addresses, hosts 101, 102, 103, 104 may send DNS requests to DNS server unit 109. Packets 201, 202, 203 are DNS requests originating from host 101 and directed towards DNS server unit 109. Packets 204, 205, 206 are DNS requests originating from host 103 and directed towards DNS server unit 109, and packets 207, 208, 209, 210 are DNS requests, directed towards DNS server unit 109, originating from host 104. Once a domain name is successfully resolved to its IP address, the DNS server unit 109 sends a response message with the IP address of the domain name back to the host from where the corresponding DNS server request originated. Next, in order to initiate communication with the domain name, the host may send a packet to the domain name by using the IP address received from DNS server unit 109 as the destination address of the packet. All such requests and responses will be represented in the network flow information that is obtained at the routers acting as the observation points.

Packets 213, 214, 215 originate from host 101 and the destination addresses of packets 213, 214, 215 are the IP addresses of domain names resolved by DNS server unit 109 in response to DNS server requests 201, 202, 203. For example, destination address of packet 213 may be the IP address of domain name resolved by DNS server unit 109 in response to DNS request 201. Similarly, packets 216 and 217 originate from hosts 103 and 104 respectively. The destination address of packet 216 may be the IP address of a domain name successfully resolved by DNS server unit 109 in response to DNS server requests 204, 205, 206. The destination address of packet 217 may be the IP address of a domain name successfully resolved by DNS server unit 109 in response to DNS server requests 207, 208, 209, 210.

In an embodiment, collector 105 may be configured with DGA-based malware detection logic to determine whether any of hosts 101, 102, 103, 104 are compromised by DGA-based malware based on messages 218, 219, 220, 221, 222. For example, based on message 218, collector 105 may determine that, within a particular time interval, host 101 originated and forwarded DNS server requests 201, 202, 203, destined for DNS server unit 109, and based on DNS server requests 201, 202, 203, collector 105 may determine the number of DNS requests made by host 101 for the particular time interval. Similarly, based on messages 219, 220, 221, 222, collector 105 may determine number of DNS requests made by hosts 102, 103, 104, respectively, for the particular time interval. The messages 218, 219, 220, 221, 222, have been determined based on the network flow information that is obtained at the routers 111, 112, 113, 114, 115, that act as the observation points.

Collector 105 may also determine the number of IP addresses contacted by hosts 101, 102, 103, 104, for the particular time interval, based on messages 218, 219, 220, 221, 222, respectively. For example, based on message 218, collector 105 may determine unique destination addresses among the destination addresses of packets 213, 214, 215 and based on the unique destination addresses, collector 105 may determine the number of IP addresses host 101 has contacted. Similarly, based on messages 219, 220, 221, 222, collector 105 may determine number of IP addresses contacted, for the particular time interval, by hosts 102, 103, 104, respectively.

In an embodiment, collector 105 may also be configured to determine, for each of the hosts 101, 102, 103, 105, a value based, at least, on a ratio of the number of DNS requests to the number of IP addresses contacted by the host. For example, assuming packets 213, 214, 215 all contact different IP addresses, then, for host 101, the value based, at least, on ratio of number of DNS server requests to number of IP addresses contacted by host 101 may be around one. Similarly, a value based, at least, on a ratio of the number of DNS server requests to the number of IP addresses contacted, for hosts 103, 104, may be around 3 and 4 respectively.

In an embodiment, the value for each host may be based on the following:

$$R_{IP} = \frac{\text{number of } DNS \text{ server requests}}{\text{number of } IP \text{ addresses contacted} + 1}$$

The value "1" that is added to the number of IP addresses contacted in $R_{IP}$ helps avoid undefined values for any particular host. For example, the value based on $R_{IP}$ for host 102 may be zero rather than an undefined value even though the number of IP addresses contacted by host 102 is zero.

In an embodiment, collector 105 may also be configured to determine an average value of the network based on the average of all ratios of all hosts 101, 102, 103, 104. In an embodiment, collector 105 may determine whether a particular host has been compromised by DGA-based malware by comparing the value determined for the particular host to the average value of the network. For example, if the value of a particular host is greater than the average value of the network by a certain threshold value or a statistical measure, then collector 105 may identify the particular host as a host that is compromised by DGA-based malware.

In an embodiment, the average value of the network for a particular time interval, time interval n, may be determined based on:

$$u_n = \emptyset_n + K\sigma_n$$

where $u_n$ is the average value of the network for time interval n, $\emptyset_n$ is the average of ratios of all hosts in a network for time interval n, K is a constant value, and $\sigma_n$ is the standard deviation of all ratios of all hosts in a network for time interval n. For example, for network 199, $\emptyset_n$ may be the average of ratios $R_{IP_{101}}$, $R_{IP_{102}}$, $R_{IP_{103}}$, $R_{IP_{104}}$, where $R_{IP_{101}}$ is the $R_{IP}$ of host 101, $R_{IP_{102}}$ is the $R_{IP}$ of host 102, and so on. $\sigma_n$, for network 199, may be the standard deviation of $R_{IP_{101}}$, $R_{IP_{102}}$, $R_{IP_{103}}$, $R_{IP_{104}}$.

In an embodiment, the average value of the network may also be determined based on an exponential forgetting function, such as:

$$u'_n = \alpha u'_{n-1} + (1-\alpha) u_n$$

where $u_n$ is the average value of the network at time interval n, $u'_n$ is the updated value at time interval n, $u'_{n-1}$ is the remembered value from previous time interval, n−1, and a is the forgetting coefficient.

In some embodiments, the number of IP addresses contacted by a particular host is determined based on the number of requests originating from the particular host. DNS requests are not included when determining the number of requests originating from the particular host. In an embodiment, if a packet is a response to a request received by the particular host from another network node, then the packet is determined to not be a request from the particular host. For example, packet 222 is a request from another network node to host 102. Packets 223, 224 originate from host 102. Collector 105 may determine whether each packet of packets 223, 224 are requests from host 102 or responses to the network node that sent packet 222 by analyzing information in message 219 relating to network flow at router 112. Based on the network flow information in message 219 that was obtained at the routers acting as the observation points, collector 105 may determine the destination address of packets 223, 224, and the send time for packets 223, 224. Additionally, collector 105 may also determine the source address of packet 222 and the receive time of packet 222.

If the receive time of a packet sent to a particular host is determined to be less than the send time of another packet from the particular host and the destination address of the packet sent from the particular host is the same as the source address of the packet received at the particular host, then the packet sent from the particular host may be identified as a response and may not be considered when determining the number of IP addresses contacted by the particular host. For example, collector 105 may further determine if the receive time of packet 222 is less than the send time of packet 223 and if the destination address of packet 223 is the same as the source address of packet 222. If so, collector 105 may determine that packet 223 is a response to the request of packet 222 and may disregard packet 223 when determining the number of IP addresses contacted by host 102. Similarly, collector 105 may determine whether packet 226 is a request from host 104 or is a response to the network node that sent packet 225.

In some embodiments, collector 105 determines whether a particular packet originating from a particular host is a request rather than a response to a request from another network node by at least determining whether the particular packet was transmitted towards a service such as a web server or a C&C server of a botmaster, and if so, the particular packet may be determined as a request. In an embodiment, determining whether a network node is a service comprises determining the average difference in number of peers between a particular endpoint of a network node and all other endpoints that the particular endpoint has communicated with, referenced herein as peers. An endpoint, as referenced herein, may be a unique combination of IP address of the network node, a port number associated with a port on the network node, and a communication protocol used in transmitting a particular packet from the network node. A network node, as referenced herein, may be any node that may originate and transmit packets, and receive packets from other nodes.

In an embodiment, collector 105 determines the average difference in number of peers between a particular endpoint of a network node and all other endpoints that the particular endpoint communicates with based on the following:

$$d_e = \text{median}\{|P_e| - |P_i|\}_{i \in P_e}$$

where $d_e$ is median of number of peers difference for an endpoint e. $P_e$ and $P_i$ are sets of peers for an endpoint e and i respectively. Collector 105 may determine the endpoint e as a service, based, at least in part on, whether the median of number of peers difference of the endpoint e, $d_e$, is greater than zero.

For example, assume that an endpoint of host 102 communicates with an endpoint of host 101 and endpoint of host 104, and also assume the endpoint of host 101 and the endpoint of host 104 only communicate with the endpoint of host 102. Collector 105, by analyzing, at least, the network flow information in message 219, determines that the number of peers of the endpoint of host 102 is two since endpoint of host 102 communicates with the endpoint of host 101 and the endpoint of host 104. Collector 105, by analyzing, at least, the network flow information in message 218, determines that the number of peers of the endpoint of host 101 is one, and by analyzing, at least, the network flow information in message 221, 222, determines that the number of peers of the endpoint of host 104 is one. Collector 105 also determines that the difference in number of peers between the endpoint of host 102 and the endpoint of host 101 is one and between the endpoint of host 102 and the endpoint of host 104 is one. Collector 105 further determines that the median of number of peers difference for the endpoint of host 102 is one, and since one is a positive number, collector 105 may also determine that the endpoint of host 102 is a service. Collector 105 determines the median of number of peers difference for the endpoint of host 101 to be negative one, and since negative one is not a positive number, collector 105 may determine that the endpoint of host 101 is not a service. Similarly, collector 105 determines the median of number of peers difference for the endpoint of host 104 to be negative one and collector 105 may determine that the endpoint of host 104 is not a service also.

In an embodiment, collector 105 determines that packets sent to either the endpoint of host 101 or the endpoint of host 104 are not requests since the endpoint of host 101 and the endpoint of host 102 have not been determined as services. Similarly, collector 105 may determine that packets sent to the endpoint of host 102 are requests since the endpoint of host 102 has been determined as a service.

In some embodiments, collector 105 determines the number of unsuccessful connections originated from a particular endpoint of a host. Collector 105 may determine whether the number of unsuccessful connections originated from the particular endpoint are greater than a certain threshold number of unsuccessful connections, and if so, collector 105 may determine that the particular endpoint of the host is not a service, even if the median of number of peers difference of the particular endpoint is greater than zero. The threshold number of unsuccessful connections that are acceptable for an endpoint to be considered a service may be determined based on the network operator's configuration. Typically the number of unsuccessful connections of a service is zero or a very low number. In an embodiment, collector 105 stores the number of unsuccessful connections originated from the particular endpoint of the host in data storage unit 106.

In some embodiments, collector 105 determines whether the IP address and the port number of a particular endpoint is the same as the IP address and port number of another endpoint, whether the port numbers of both endpoints is greater than 1023, and whether the communication protocol of one of the endpoints is Transmission Control Protocol (TCP) and the communication protocol of the other endpoint is User Datagram Protocol (UDP). If so, collector 105 may determine that the particular endpoint is not a service, even if the median of number of peers difference of the particular endpoint is greater than zero. In an embodiment, collector 105 stores in data storage unit 106 that the particular endpoint of a host is not a service.

Figure 3:
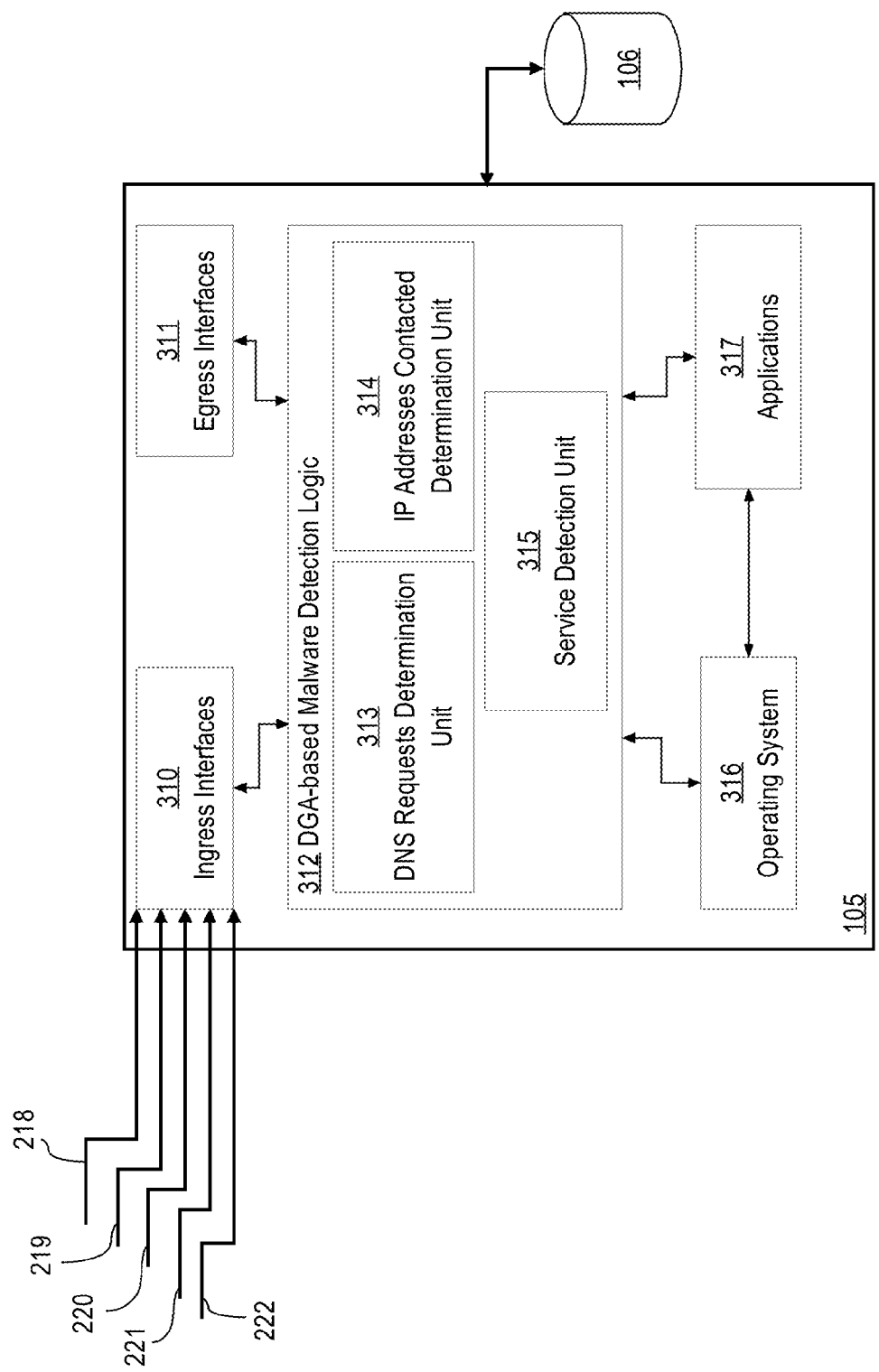
FIG. 3 illustrates functional logic of a computing device aggregating network flow information.

All the functions, determinations, calculations and logical operations described above may be implemented using one or more elements of electronic digital logic, or one or more computer programs or other software elements, in various embodiments. FIG. 3 illustrates functional logic of an embodiment as implemented in a device receiving network flow information from routers in a network.

In an embodiment, collector 105 comprises DGA-based malware detection logic 312 coupled to one or more ingress interfaces 310 and one or more egress interfaces 311. At collector 105, one or more messages comprising network flow information, such as messages 218, 219, 220, 221, 222, may be received at one or more of the ingress interfaces 310. The one or more messages received at one or more of the ingress interfaces 310 may be stored in data storage unit 106. In an embodiment, DGA-based malware detection logic 312 comprises a DNS requests determination unit 313 and an IP addresses contacted determination unit 314. In an embodiment, the DNS requests determination unit 313 is configured to analyze network flow information in messages received on the one or more ingress interfaces 310, for determining the number of DNS requests made by each host within the network. The determined number of DNS requests made by a host may be stored in data storage unit 106.

In an embodiment, IP addresses contacted determination unit 314 is configured to analyze network flow information in messages received on the one or more ingress interfaces 310, for determining the number of IP addresses contacted by each host within the network. IP addresses contacted determination unit 314 may be configured to determine the number of IP addresses contacted based on data obtained from service detection unit 315. The determined number of IP addresses contacted by a host may be stored in data storage unit 106.

The DGA-based malware detection logic 312 may be coupled to operating system 316 and one or more applications 317 that may be configured to receive direct user input. For example, applications 317 may implement a graphical user interface that provides a graphical depiction of network flow information aggregated by collector 105.

3.0 Method of Detecting DGA-Based Malware Using Network Flow Information

Figure 4:
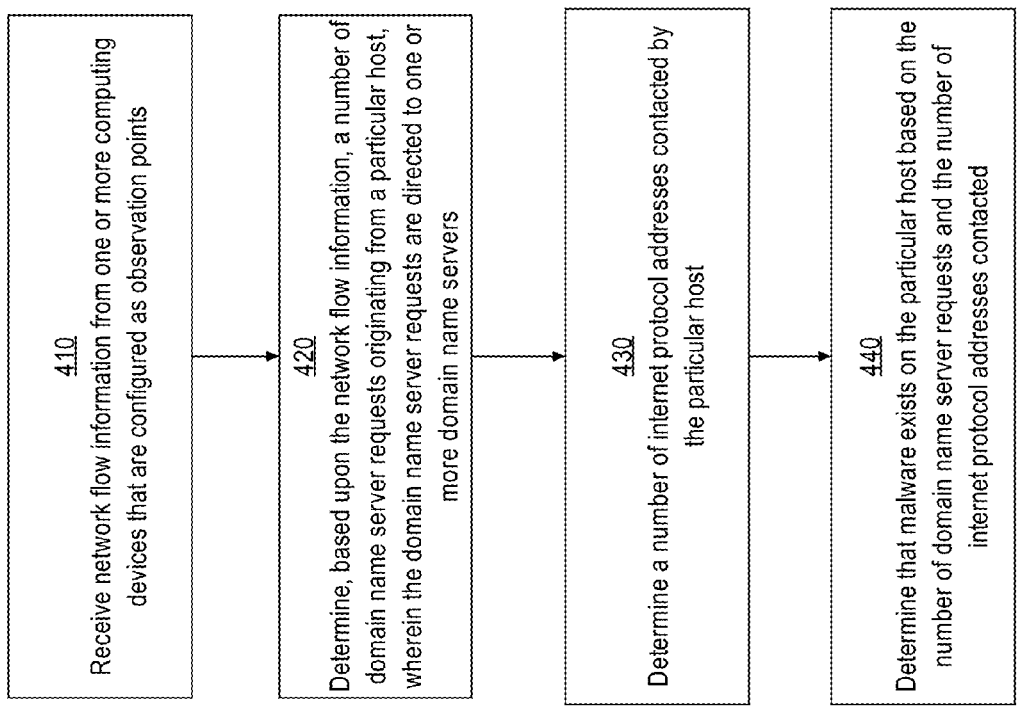
FIG. 4 illustrates a method of detecting DGA-based malware.

FIG. 4 illustrates an example method of detecting DGA-based malware. In an embodiment, the operations described for FIG. 4 may be performed by a computing device such as the collector 105 of FIG. 1, FIG. 2, and FIG. 3, in a communications network that comprises at least a plurality of hosts, but other embodiments may implement the same functions in other contexts using other computing devices.

In step 410, network flow information from one or more computing devices that are configured as observation points is received at a computing device implementing DGA-based malware detection logic. In an embodiment, the network flow information is received in messages that are formatted according to internet protocol flow information export (IPFIX) or NetFlow protocols and/or output from an IPFIX service or NetFlow service that is hosted on or executed by the one or more computing devices.

In step 420, the number of domain name server requests originating from a particular host is determined. The number of domain name server requests may be determined based on the network flow information. The domain name server requests are directed to one or more domain name servers. In an embodiment, the number of domain server requests may be determined based, at least in part, on evaluating fields of one or more messages that comprise network flow information associated with the particular host. The one or more messages may conform to a network flow protocol such as the NetFlow protocol or the IPFIX protocol. In an embodiment, the determined number of domain name server requests may be stored in a storage unit.

In step 430, the number of internet protocol addresses contacted by the particular host is determined. The number of internet protocol addresses contacted by the particular host may be based, in part, on the number of requests originating from an endpoint of the particular host. In an embodiment, a packet associated with the endpoint of the particular host is determined to be a request packet if the packet is transmitted towards a service. A service may be an endpoint that has a median of number of peers difference greater than zero. In some embodiments, whether an endpoint is a service is also determined based on the number of unsuccessful connections originating from the endpoint. For example, if the number of unsuccessful connections originating from an endpoint is greater than a threshold number of unsuccessful connections, then the endpoint is determined to be not a service.

In some embodiments, whether an endpoint is a service is also determined based on whether the IP address and port number of an endpoint is the same as the IP address and port number of another endpoint, whether the port numbers of the endpoints are greater than 1023, and whether the communication protocol of one of the endpoints is TCP while the communication protocol of the other endpoint is UDP. For example, assume that the IP address and port numbers of a first endpoint and a second endpoint are the same and that the port numbers of both the first endpoint and the second endpoint are 1024. If the communication protocol of the first endpoint is a TCP and the communication protocol of the second endpoint is UDP then both the first endpoint and the second endpoint are determined not to be a service. Similarly, if the communication protocol of the first endpoint is UDP and the communication protocol of the second endpoint is TCP, then again both the first endpoint and the second endpoint are determined not to be a service.

In step 440, existence of malware on the particular host is determined based on the number of domain name server requests originated from the particular host and the number of internet protocol addresses contacted by the particular host. In an embodiment, a ratio of the number of domain name server requests that originated from the particular host to the number of internet protocol addresses contacted by the particular host is determined for the particular host. A particular value based on the ratio may be determined and compared to a particular threshold value, and if the particular value based on the ratio is greater than the particular threshold value, then the particular host may be determined as being compromised by DGA-based malware.

In an embodiment, the particular threshold value is determined based on a previous threshold value and a plurality of ratios of number of domain name server requests to internet protocol addresses contacted. Each ratio of the plurality of ratios may be associated with a different corresponding host in the network. The previous threshold value may be a certain threshold value determined at a previous period of time and may be determined based on network flow information available for that period of time or up until that period of time. The operations described for FIG. 4 may be performed periodically.

Therefore, the long-felt but unfulfilled need for a fast, accurate, and privacy preserving approach for detection of DGA-based malware is now fulfilled.

4.0 Other Disclosure

The disclosure also encompasses the subject matter set forth in the following numbered clauses:

1. A non-transitory computer-readable storage medium storing one or more sequences of instructions, which when executed by one or more processors, cause the one or more processors to perform: using a computing device, in a communications network that comprises at least a plurality of hosts, receiving network flow information from one or more other computing devices that are configured as observation points, and based upon the network flow information, determining a number of domain name server requests originating from a particular host among the plurality of hosts, wherein the domain name server requests are directed to one or more domain name servers; determining a number of internet protocol addresses contacted by the particular host; determining that malware exists on the particular host based on the number of domain name server requests and the number of internet protocol addresses contacted.

2. The non-transitory computer-readable storage medium of clause 1, further comprising: for the particular host, determining a ratio of the number of domain name server requests to the number of internet protocol addresses contacted; determining that a value based on the ratio is higher than a particular threshold value; determining that malware exists on the particular host based on the determination that the value is higher than the particular threshold value.

3. The non-transitory computer-readable storage medium of clause 2, further comprising: determining the particular threshold value based on a previous threshold value and a plurality of ratios, wherein each ratio of the plurality of ratios is associated with a different corresponding host of the plurality of hosts and is a ratio of domain name server requests originating from the corresponding host to internet protocol addresses contacted by the corresponding host.

4. The non-transitory computer-readable storage medium of clause 1, further comprising: determining the number of internet protocol addresses contacted by the particular host based only upon the network flow information associated with the particular host.

5. The non-transitory computer-readable storage medium of clause 4, wherein the one or more messages conform to a NetFlow protocol or an Internet Protocol Flow Information Export (IPFIX) protocol.

6. The non-transitory computer-readable storage medium of clause 1, further comprising: determining, based on the network flow information, a number of requests originating from an endpoint of the particular host, wherein the endpoint is a unique combination of an internet protocol address of the particular host, a port number associated with a port on the particular host and a communication protocol used in transmitting a particular packet that originated from the particular host; determining the number of internet protocol addresses contacted by the particular host, based, at least in part, on the number of requests originating from the endpoint of the particular host.

7. The non-transitory computer-readable storage medium of clause 6, further comprising: determining a certain endpoint of a certain network node is a service; identifying, from the network flow information, one or more packets directed to the certain endpoint from the endpoint of the particular host as request packets; determining, based on the identified request packets, the number of requests originating from the endpoint of the particular host; determining, based, at least in part, on the number of requests originating from the endpoint of the particular host, the number of internet protocol addresses contacted by the particular host.

8. The non-transitory computer-readable storage medium of clause 7, further comprising: determining a number of peers of the certain endpoint of the certain network node; determining, based on the number of peers of the certain endpoint, a median of the number of peers difference for the certain endpoint; determining the median of the number of peers difference for the certain endpoint is greater than zero; determining, based, at least in part on that the median of the number of peers difference for the certain endpoint is greater than zero, the certain endpoint of the certain network node is a service.

9. The non-transitory computer-readable storage medium of clause 8, further comprising: determining a number of unsuccessful connections originating from the certain endpoint; determining the number of unsuccessful connections originating from the certain endpoint is not greater than a threshold number of unsuccessful connections that are acceptable for a service; determining, based, at least in part on that the median of the number of peers difference for the certain endpoint is greater than zero and that the number of unsuccessful connections originating from the certain endpoint is not greater than the threshold number of unsuccessful connections that are acceptable for a service, the certain endpoint of the certain network node is a service.

10. The non-transitory computer-readable storage medium of clause 8, further comprising: determining the certain endpoint does not communicate on ports with a port number greater than 1023; determining, based, at least in part on that the median of the number of peers difference for the certain endpoint is greater than zero and that the certain endpoint does not communicate on ports with a port number greater than 1023, the certain endpoint of the certain network node is a service.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
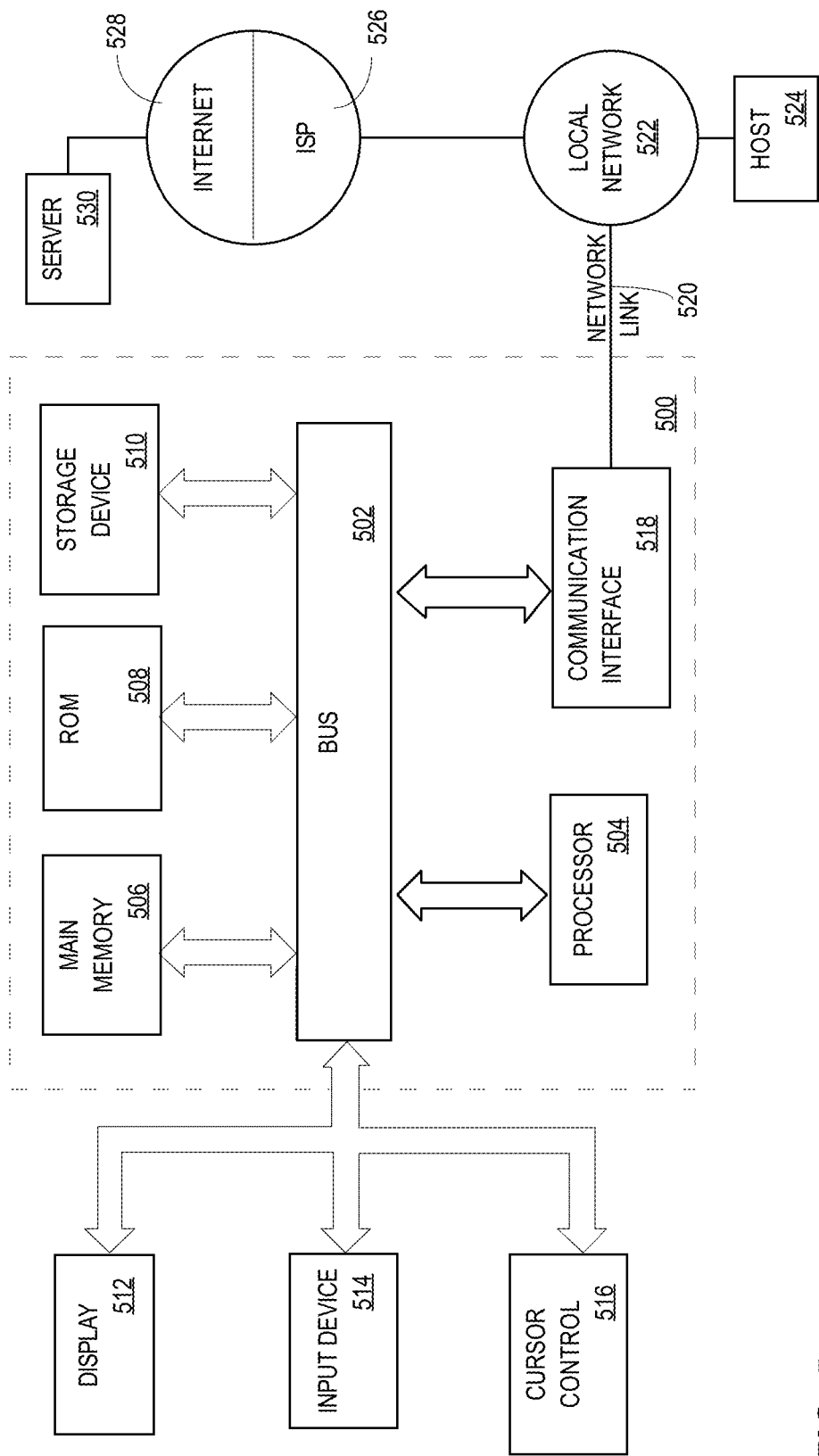
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
using a computing device, in a communications network that comprises at least a plurality of hosts, receiving network flow information from one or more other computing devices that are configured as observation points, and based upon the network flow information, determining a number of domain name server requests originating from a particular host among the plurality of hosts, wherein the domain name server requests are directed to one or more domain name servers;
using the computing device,
determining, based on the network flow information, a number of requests originating from an endpoint of the particular host, wherein the endpoint is a unique combination of an internet protocol address of the particular host, a port number associated with a port on the particular host and a communication protocol used in transmitting a particular packet that originated from the particular host;
determining, based on, at least in part, the number of requests originating from the endpoint of the particular host, a number of internet protocol addresses contacted by the particular host;
using the computing device, determining that malware exists on the particular host based on the number of domain name server requests and the number of internet protocol addresses contacted, wherein determining that malware exists on the particular host includes one or more of: determining a ratio of the number of domain name server requests to the number of internet protocol addresses contacted, determining whether the ratio exceeds a particular threshold value, determining an average value of ratios computed for the one or more other computing devices and comparing the average value with the ratio determined for the particular host, or determining a number of peers of the particular host based on the number of domain name server requests and the number of internet protocol addresses contacted and determining a median of the number of peers.

2. The computer-implemented method of claim 1, further comprising:
determining that a value based on the ratio;
determining that malware exists on the particular host based on the determination that the value is higher than the particular threshold value.

3. The computer-implemented method of claim 2, further comprising determining the particular threshold value based on a previous threshold value and a plurality of ratios, wherein each ratio of the plurality of ratios is associated with a different corresponding host of the plurality of hosts and is a ratio of domain name server requests originating from the corresponding host to internet protocol addresses contacted by the corresponding host.

4. The computer-implemented method of claim 1, further comprising determining the number of internet protocol addresses contacted by the particular host based only upon the network flow information associated with the particular host.

5. The computer-implemented method of claim 1, wherein the network flow information is from any of a NetFlow protocol or an Internet Protocol Flow Information Export (IPFIX) protocol.

6. The computer-implemented method of claim 1, further comprising:
determining whether a certain endpoint of a certain network node is a service;
identifying, from the network flow information, one or more packets directed to the certain endpoint from the endpoint of the particular host as request packets;
determining, based on the one or more packets, the number of requests originating from the endpoint of the particular host;
determining, based, at least in part, on the number of requests originating from the endpoint of the particular host, the number of internet protocol addresses contacted by the particular host.

7. The computer-implemented method of claim 6, further comprising:
determining a number of peers of the certain endpoint of the certain network node;
determining, based on the number of peers of the certain endpoint, a median of the number of peers for the certain endpoint;
determining the median of the number of peers for the certain endpoint is greater than zero;
determining, based, at least in part on that the median of the number of peers for the certain endpoint is greater than zero, the certain endpoint of the certain network node is a service.

8. The computer-implemented method of claim 7, further comprising:
determining a number of unsuccessful connections originating from the certain endpoint;
determining the number of unsuccessful connections originating from the certain endpoint is not greater than a threshold number of unsuccessful connections that are acceptable for a service;
determining, based, at least in part on that the median of the number of peers for the certain endpoint is greater than zero and that the number of unsuccessful connections originating from the certain endpoint is not greater than the threshold number of unsuccessful connections that are acceptable for a service, the certain endpoint of the certain network node is a service.

9. The computer-implemented method of claim 7, further comprising:
determining the certain endpoint does not communicate on ports with a port number greater than 1023;
determining, based, at least in part on that the median of the number of peers for the certain endpoint is greater than zero and that the certain endpoint does not communicate on ports with a port number greater than 1023, the certain endpoint of the certain network node is a service.

10. A data processing apparatus configured with improved detection of domain generating algorithm (DGA)-based malware based upon network flow information, comprising:
one or more processors;

one or more interfaces that are configured to couple to a communications network that comprises at least a plurality of hosts;

one or more non-transitory computer-readable storage media storing one or more sequences of instructions which, when executed by the one or more processors, cause the one or more processors to perform:

receiving network flow information from one or more other computing devices that are configured as observation points, and based upon the network flow information, determining a number of domain name server requests originating from a particular host among the plurality of hosts, wherein the domain name server requests are directed to one or more domain name servers;

determining, based on the network flow information, a number of requests originating from an endpoint of the particular host, wherein the endpoint is a unique combination of an internet protocol address of the particular host, a port number associated with a port on the particular host and a communication protocol used in transmitting a particular packet that originated from the particular host;

determining, based on, at least in part, the number of requests originating from the endpoint of the particular host, a number of internet protocol addresses contacted by the particular host;

determining that malware exists on the particular host based on the number of domain name server requests and the number of internet protocol addresses contacted, wherein determining that malware exists on the particular host includes one or more of:

determining a ratio of the number of domain name server requests to the number of internet protocol addresses contacted, determining whether the ratio exceeds a particular threshold value, determining an average value of ratios computed for the one or more other computing devices and comparing the average value with the ratio determined for the particular host, or determining a number of peers of the particular host based on the number of domain name server requests and the number of internet protocol addresses contacted and determining a median of the number of peers.

11. The apparatus of claim 10, the storage media further comprising instructions which when executed cause the one or more processors to perform:

determining that a value based on the ratio;

determining that malware exists on the particular host based on the determination that the value is higher than the particular threshold value.

12. The apparatus of claim 11, the storage media further comprising instructions which when executed cause the one or more processors to perform determining the particular threshold value based on a previous threshold value and a plurality of ratios, wherein each ratio of the plurality of ratios is associated with a different corresponding host of the plurality of hosts and is a ratio of domain name server requests originating from the corresponding host to internet protocol addresses contacted by the corresponding host.

13. The apparatus of claim 10, the storage media further comprising instructions which when executed cause the one or more processors to perform determining the number of internet protocol addresses contacted by the particular host based only upon the network flow information associated with the particular host.

14. The apparatus of claim 13, wherein the network flow information is from any of a NetFlow protocol or an Internet Protocol Flow Information Export (IPFIX) protocol.

15. The apparatus of claim 10, the storage media further comprising instructions which when executed cause the one or more processors to perform:

determining a certain endpoint of a certain network node is a service;

identifying, from the network flow information, one or more packets directed to the certain endpoint from the endpoint of the particular host as request packets;

determining, based on the one or more packets, the number of requests originating from the endpoint of the particular host;

determining, based, at least in part, on the number of requests originating from the endpoint of the particular host, the number of internet protocol addresses contacted by the particular host.

16. The apparatus of claim 15, the storage media further comprising instructions which when executed cause the one or more processors to perform:

determining a number of peers of the certain endpoint of the certain network node;

determining, based on the number of peers of the certain endpoint, a median of the number of peers for the certain endpoint;

determining the median of the number of peers for the certain endpoint is greater than zero;

determining, based, at least in part on that the median of the number of peers for the certain endpoint is greater than zero, the certain endpoint of the certain network node is a service.

17. The apparatus of claim 16, the storage media further comprising instructions which when executed cause the one or more processors to perform:

determining a number of unsuccessful connections originating from the certain endpoint;

determining the number of unsuccessful connections originating from the certain endpoint is not greater than a threshold number of unsuccessful connections that are acceptable for a service;

determining, based, at least in part on that the median of the number of peers for the certain endpoint is greater than zero and that the number of unsuccessful connections originating from the certain endpoint is not greater than the threshold number of unsuccessful connections that are acceptable for a service, the certain endpoint of the certain network node is a service.

18. The apparatus of claim 16, the storage media further comprising instructions which when executed cause the one or more processors to perform:

determining the certain endpoint does not communicate on ports with a port number greater than 1023;

determining, based, at least in part on that the median of the number of peers for the certain endpoint is greater than zero and that the certain endpoint does not communicate on ports with a port number greater than 1023, the certain endpoint of the certain network node is a service.

* * * * *